United States Patent [19]

Gookins et al.

[11] 4,293,854
[45] Oct. 6, 1981

[54] MONITOR MEANS AND METHOD FOR GRAIN BIN

[76] Inventors: William L. Gookins, R.R. 1, Box 49, Attica, Ind. 47918; Junior K. King, R.R. 1, Box 106A, Russiaville, Ind. 46979

[21] Appl. No.: 61,770

[22] Filed: Jul. 30, 1979

[51] Int. Cl.³ .................... G08B 21/00; G01N 11/14
[52] U.S. Cl. .......................... 340/615; 73/59
[58] Field of Search ............ 340/177 R, 603, 615, 340/189 M, 539; 73/59

[56] References Cited

U.S. PATENT DOCUMENTS

| | | | |
|---|---|---|---|
| Re. 27,931 | 2/1974 | Sukup | 259/102 |
| 1,239,315 | 9/1917 | Stine | 340/615 |
| 2,399,015 | 4/1946 | Gaffney | 340/615 |
| 3,156,541 | 11/1964 | Kalke | 34/181 |
| 3,169,395 | 2/1965 | Enoch et al. | 73/59 |
| 3,251,582 | 5/1966 | Murphy | 259/111 |
| 3,448,966 | 6/1969 | Sukup | 259/111 |
| 3,563,460 | 2/1971 | Nine | 236/49 |
| 3,580,549 | 5/1971 | Murphy | 259/102 |
| 3,591,235 | 7/1971 | Addison | 340/189 M |
| 4,162,448 | 7/1979 | Gilmour | 340/539 |

Primary Examiner—Thomas A. Robinson
Attorney, Agent, or Firm—Woodard, Weikart, Emhardt & Naughton

[57] ABSTRACT

A grain storage bin having a content stirring machine therein, has a temperature sensor adjacent the stirring tool. The sensor is translated through the material in the bin by the stirring machine. A readout device outside the bin is coupled to the sensor wirelessly, or through slip ring contactors, there being appropriate circuitry associated with the sensor and readout device for the necessary information handling and processing. Possibilities for temperature and humidity determinations in the environment as well as in bin contents, and drier control, as needed, are disclosed.

17 Claims, 10 Drawing Figures

MONITOR MEANS AND METHOD FOR GRAIN BIN

BACKGROUND OF THE INVENTION

1. Field of the Invention

This invention relates generally to grain storage, and more particularly to means to monitor grain in storage to avoid spoilage.

2. Description of the Prior Art

It is well known that grain in storage is susceptible to spoilage due to various factors including excessive moisture content, condensation resulting from temperature changes, and insects. It is sometimes possible to detect conditions which are conductive to spoilage, or evidence of it. Upon detection of such conditions, steps can be taken to counteract, or at least neutralize the conditions contributing toward spoilage. An example of means for detection of localized temperature rises, and for activating a fan in response to detection of excessive temperatures is shown in a U.S. Pat. No. 3,563,460 issued Feb. 16, 1971, to Phillip L. Nine. Means for stirring or circulating stored grain are shown in various U.S. Patents, several of which are as follows:

| Patent No. | Patentee | Issue Date |
|---|---|---|
| 3,156,541 | Kalke | 11/10/64 |
| 3,251,582 | Murphy | 5/17/66 |
| 3,448,966 | Sukup | 6/10/69 |
| 3,580,549 | Murphy | 5/25/71 |
| Re. 27,931 | Sukup | 2/26/74 |

Although the Nine patent discloses means for sensing temperature rise, and for controlling fan operation in response to excessive temperature, the probes employed in that patent cannot be left in the position illustrated therein, if used in a storage bin employing the stirring devices shown in the other patents listed above, because the stirrers would interface with the probes, and vice versa. Therefore, the monitoring of temperature in such bins has required periodic sampling by probes inserted manually through sidewalls of the bins, and then removed, or by probes inserted manually downward from the top. The inconvenience of such procedures, and the danger involved in trying to insert probes from the top of the grain, have discouraged any regular sampling, with the result that it simply is not done as often as it should be done. Moreover, since the sampling with manual probes is localized at best, it is quite possible that isolated hot spots and regions of early stages of deterioration of the grain, are not readily monitored and may be detected only by chance.

SUMMARY OF THE INVENTION

Described briefly, according to an embodiment of the present invention, a condition sensor, likely a temperature sensor, is located in the grain in a bin. It is moved through the grain and transmits information in accordance with the condition sensed. The sensor is mounted to an auger mount on a stirrer apparatus so that it moves in a generally horizontal direction and, during a predetermined period of time, can traverse a large portion of the area of the bin and sense the condition of grain augered upward ahead of the sensor as it is moved through the grain. The information is transmitted to a readout, which may have an alarm associated with it to signal the existence of an undesirable detected condition.

DETAILED DESCRIPTION OF THE PREFERRED EMBODIMENT

Figure 1:
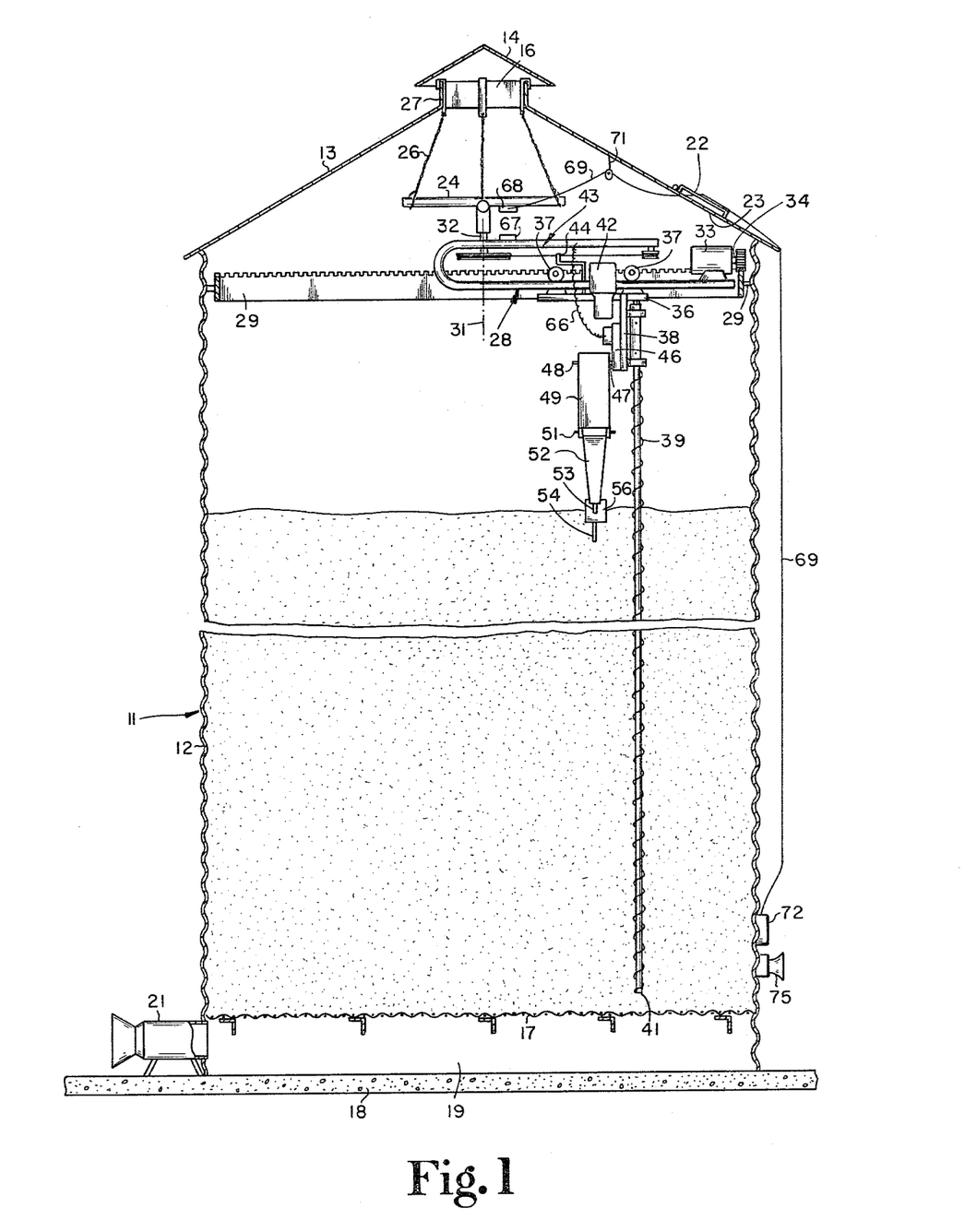
FIG. 1 is a schematic vertical section through a grain bin incorporating a stirrer and monitor apparatus according to a typical embodiment of the present invention.

Referring now to the drawings in detail, and particularly FIG. 1, the grain bin 11 has a cylindrical wall 12, generally conical roof 13, and a ventilator cover 14 over a top central opening 16. A perforated floor 17 is located near the bottom of the bin and is based above a foundation floor 18. A plenum 19 is thereby provided under the floor 17. Air can be supplied to this plenum and thence up through the floor by means of a fan 21. In this way, the contents of the bin can be dried to the extent desired. A roof door 22 can be provided over an access opening 23 in the roof.

One form of grain stirring apparatus is disclosed in the above mentioned Kalke and Murphy patents. It includes a suspension Tee bar 24 suspended from chains 26 hooked over a collar 27 at the vent opening 16. This provides a central support for a bridge frame 28. Track 29 secured to the bin wall provides outboard support for the bridge frame 28 which is supported on the track 29 by rollers. There is a pivotal mounting of the bridge frame to the Tee bar to pivot on a vertical axis 31 at 32. There is a motor 33 which has a drive gear 34 on its output shaft. This gear engages a gear rack at the upper edge of the support track 29 whereby the motor can drive the bridge frame in a circle about the axis 31.

A carriage 36 is mounted by rollers 37 to the bridge frame. An auger mounting leg 38 is mounted to the carriage 36 and supports an auger 39 extending vertically downward therefrom to a point 41 near the container floor 17. The auger is driven by motor/gear drive assembly 42. A cable and pulley assembly 43 mounted to the bridge frame 28 is connected by arm 44 to the carriage. It is effective to drive the carriage radially outward and inward as the bridge frame is rotated in the bin by the drive motor 33. Details of such structure are provided in U.S. Pat. Nos. 3,251,582 and 3,580,549 for the specific type of arrangement shown in FIG. 1 here. The other above mentioned patents show other variations. In any event, these features are not a part of the present invention. However, the present invention does employ the rotation and translation of the carriage in a manner and for a purpose which will now be described.

Figure 2:
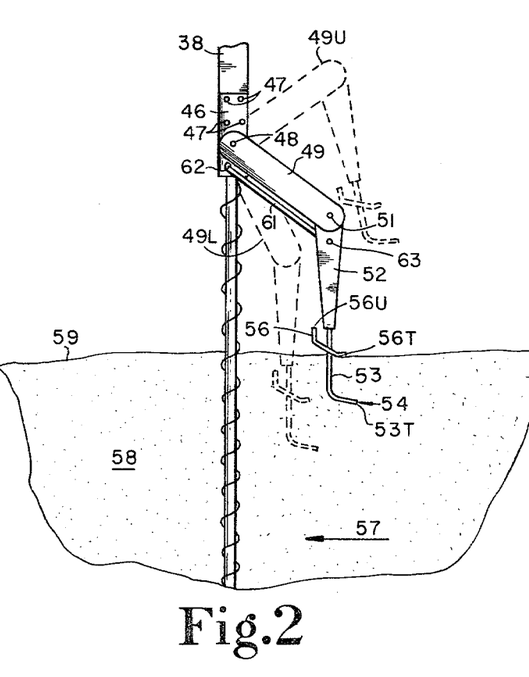
FIG. 2 is a fragmentary side elevational view of the sensor probe and mounting arm assembly.
Figure 3:
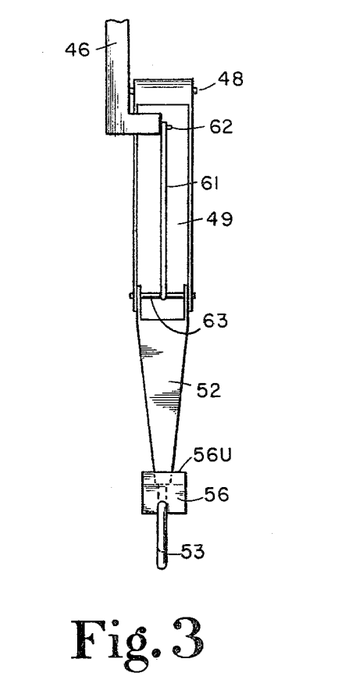
FIG. 3 is a pictorial view of the sensor probe and mounting arm assembly in a direction generally opposite that of FIG. 1.

Referring now to FIGS. 1, 2 and 3, an attaching plate 46 is attached to the downwardly extending (depending) auger mounting leg 38 by means of four bolts 47. Plate 46 has a pin 48 projecting horizontally therefrom to which a transverse arm 49 (which may be called a primary arm) is pivotally mounted. A pin 51 at the outer end of arm 49 is pinned to the upper end of a vertical arm 52, which may be called a secondary arm. A probe tube 53 extends from the lower end of the secondary arm and has a sensor 54 secured inside the lower end thereof. This will usually be a temperature sensor. A sled 56 is secured to the tube 53 slightly below the lower end of the secondary arm 52.

In FIG. 2, the arrow 57 represents the direction of movement of the depending leg 38 about the axis 31 of the suspension. It is seen that the primary arm 49 is in a trailing attitude with respect to the attaching plate 46. Also the probe tube 53 is curved to the rear, or in a trailing attitude. Also, the sled 56 commences at the upper edge 56U and extends downward and toward the rear and then horizontally directly toward the trailing edge 56T. This facilitates movement of the probe through the grain 58 while the sled rides on the surface 59 of the grain, and the probe tube portion below the surface runs in the grain with the sensor at the trailing tip 53T about twelve inches below the surface of the grain.

It is recognized that the top of the grain may not always be at the same level, and that there may also be some contouring of the surface of the grain. To accomodate this, the pivotal mounting of the arm 49 about pin 48 enables it to move to the uppermost position shown by the dotted line 49U. It can also descend to the lowermost position indicated by the dotted line 49L. It is nevertheless desirable to maintain the attitude of the probe and sled approximately the same at all positions between these extremes. For that purpose, a modified parallelogram linkage is established by means of the link 61 which is pivotally pinned at the pin 62 affixed to the attaching plate 46 and pin 63 attached to the trailing arm 52. This link thereby maintains the correct attitude of the trailing arm 52, probe tube 53 and sled, at all times.

An electrical conductor extends from the sensor 54, up through the tube 53 and arms 52 and 49 and cable 66 (FIG. 1) to a transmitter 67. A receiver 68 is mounted to the Tee bar 24. A signal cable 69 extends from the receiver through a roof mounted hanger 71 and through the roof door opening and under the roof door out to the exterior of the bin and down to a readout box 72.

Figure 1A:
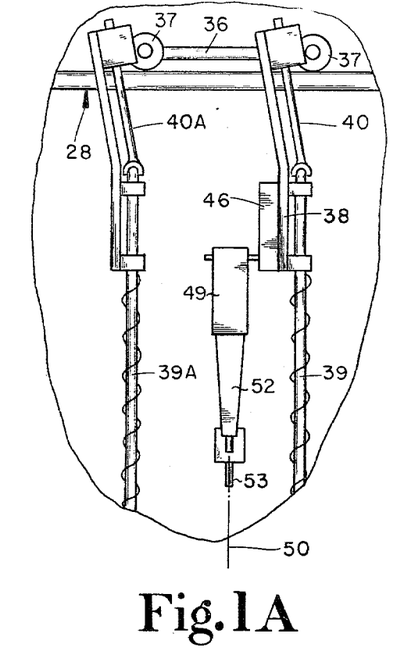
FIG. 1A is a fragmentary elevational view similar to FIG. 1, but showing apparatus wherein there are two augers 39 and 39A mounted to the carriage, with the probe and sensor located between them.

FIG. 1A illustrates an embodiment wherein there are two augers, 39 and 39A, each having appropriate drive means for it, and both of the assemblies being mounted to a carriage 36 supported by rollers 37 mounted on the bridge frame 28. It may be noted that the drive shafts 40 and 40A are disposed at an incline in this embodiment, in contrast to that of FIG. 1. This particular inclined shaft and support arrangement can be found in the above-mentioned U.S. Pat. No. 3,580,549. In this embodiment, the probe is mounted in the same way as previously described but, since there are two augers, the sensor is located in a plane 50 tangent to a circle around the axis 31 and located between the augers. Accordingly, the sensor is in a trailing relationship to the augers, as described above with reference to FIG. 2 and, since it moves in a path concentric with but between the paths of the augers, it is able to sense the condition of grain stirred upward by both of the augers.

Whenever it is desired to monitor the condition of the grain, the stirrer apparatus is started in the conventional manner as described in the afore-mentioned patents. As the augers auger the grain up, this occurs immediately ahead of the sensor as best shown in FIGS. 1 and 2. In this way, the sensor can detect the presence of heated grain which has been raised from somewhere below in the bin. This procedure will occur throughout the bin as the stirrers make a complete coverage of the contents, such coverage being described in the afore-mentioned patents. Upon detection of an elevated temperature level, the readout signal can be used to trigger an alarm as at 75 (FIG. 1) above some predetermined set limit, or can be utilized to start operation of the fan. Also, readouts indicative of excessive variations in temperature can be used to indicate or initiate corrective action.

Circuitry for use in the transmitter and receiver will now be described with reference to FIGS. 4, 5 and 6.

Figures 4, 7, 8, 9:
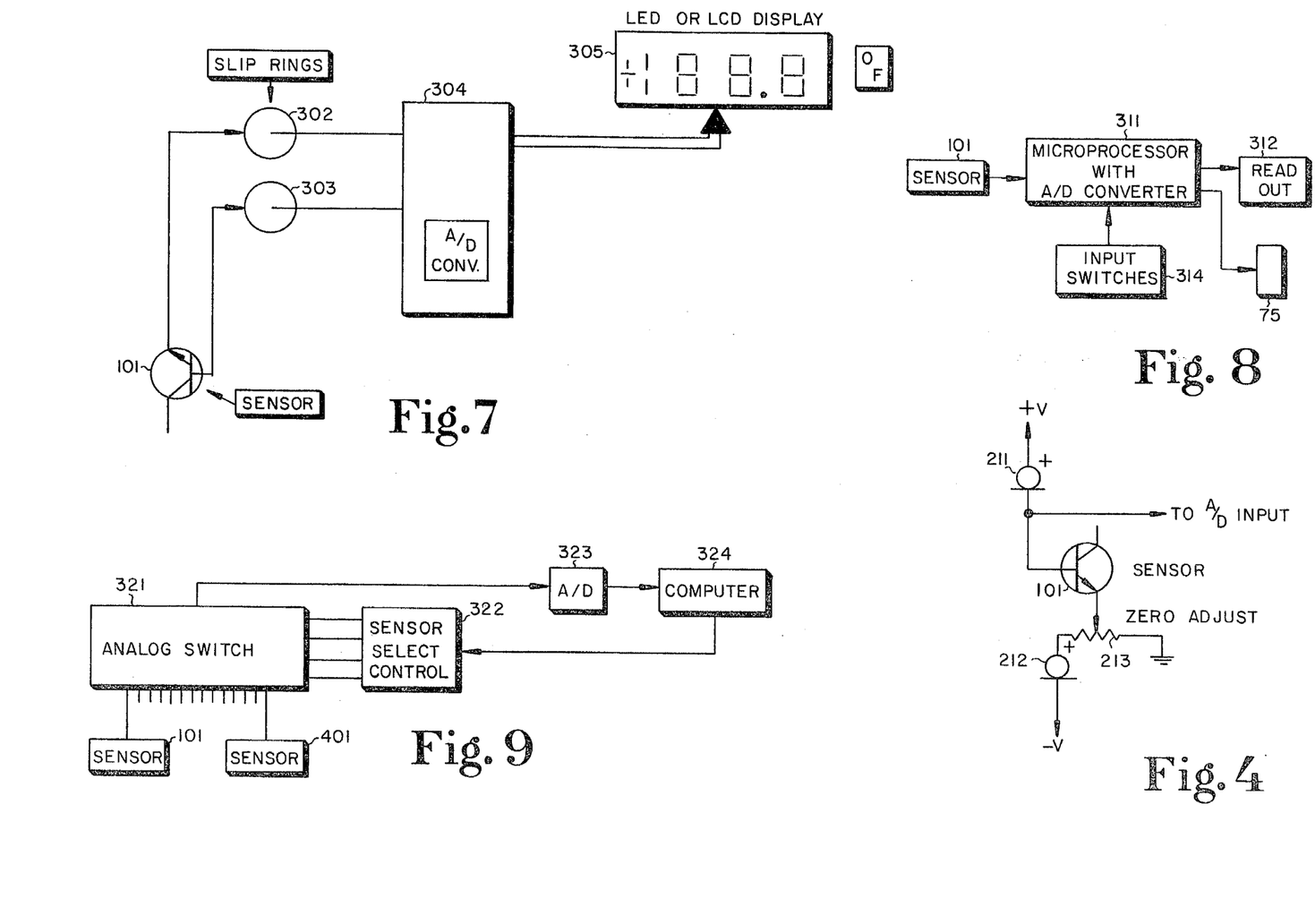
FIG. 4 is a schematic diagram of sensor circuitry.
FIG. 7 is a block diagram of a version using slip ring contactor between the sensor and processing circuit.
FIG. 8 is a block diagram of a version utilizing temperature selector switch inputs with a micro-processor.
FIG. 9 is a block diagram of a version utilizing a plurality of condition sensors and sensor selector switches together with a computer to control processing of contents of a storage vessel.

Referring now to FIG. 4, direct current inputs from a suitable power supply are represented by the usual symbols. Transistor 101 is an NPN transistor which is used with the collector open, as a diode, for the temperature sensing element and is actually located in and is a part of the sensor 54, referred to above. The constant current diode 211, also in the sensor detail FIG. 4, passes a constant current through transistor 101. At transistor 101, a DC voltage is generated which is inversely proportional to the temperature of the transistor. Diode 212 and potentiometer (pot) 213 provide a fixed voltage to null out the finite voltage of the sensor and provide a zero reading for zero degrees F. The sensor voltage is then passed to an A/D converter 104 via filtering components 102 and 103, as is seen in FIG. 5.

The sensor voltage is compared with a reference voltage generated by components 163, 164, and 166, (all seen in FIG. 5) and converted to its decimal equivalent in binary coded decimal (BCD) form. This BCD data is then loaded sequentially into shift registers 131, 132, and 133. The least significant digit is located in 133, and the most significant in 131.

When the conversion is complete, a signal which is generated by components 114, 116, 117, 118, 119, 121, and 122, will enable the controller formed by components 126, 127, 128, and 129 to instruct the select gate 113 to apply eleven clock pulses to the shift registers, to serially shift the temperature data out to the pulse width generators 139 and 158. Transistor 135 samples the first two bits of the shift register 131 to insure that the first bit transmitted will always be a sync pulse.

Pulse generator 139 is active when data is a one or a sync. Pulse generator 158 is active when the data is a zero. These pulses are diode or'ed by diodes 141 and 142 and used to turn on transistor 144 which applies power to the resonant circuit consisting of capacitor 147 and inductor 148. This allows bursts of 200 kHz from oscillator 157 to radiate from antenna 167. The pulse durations are one millisecond (mS) for zero, two mS for a one, and three mS for a sync pulse. This data format is the same or similar to that used by the National Bureau of Standards on their Radio Station WWVB to transmit time information.

Oscillator 157 runs at 200 kHz. It is adjustable by pot 154 and is divided by thirty-two in binary divider 153 to derive the 6250 Hz A/D clock. The 6250 Hz is further divided by a factor of 24 in the A/D converter chip 104 which is then used as the 260 Hz shift register clock.

Figure 6:
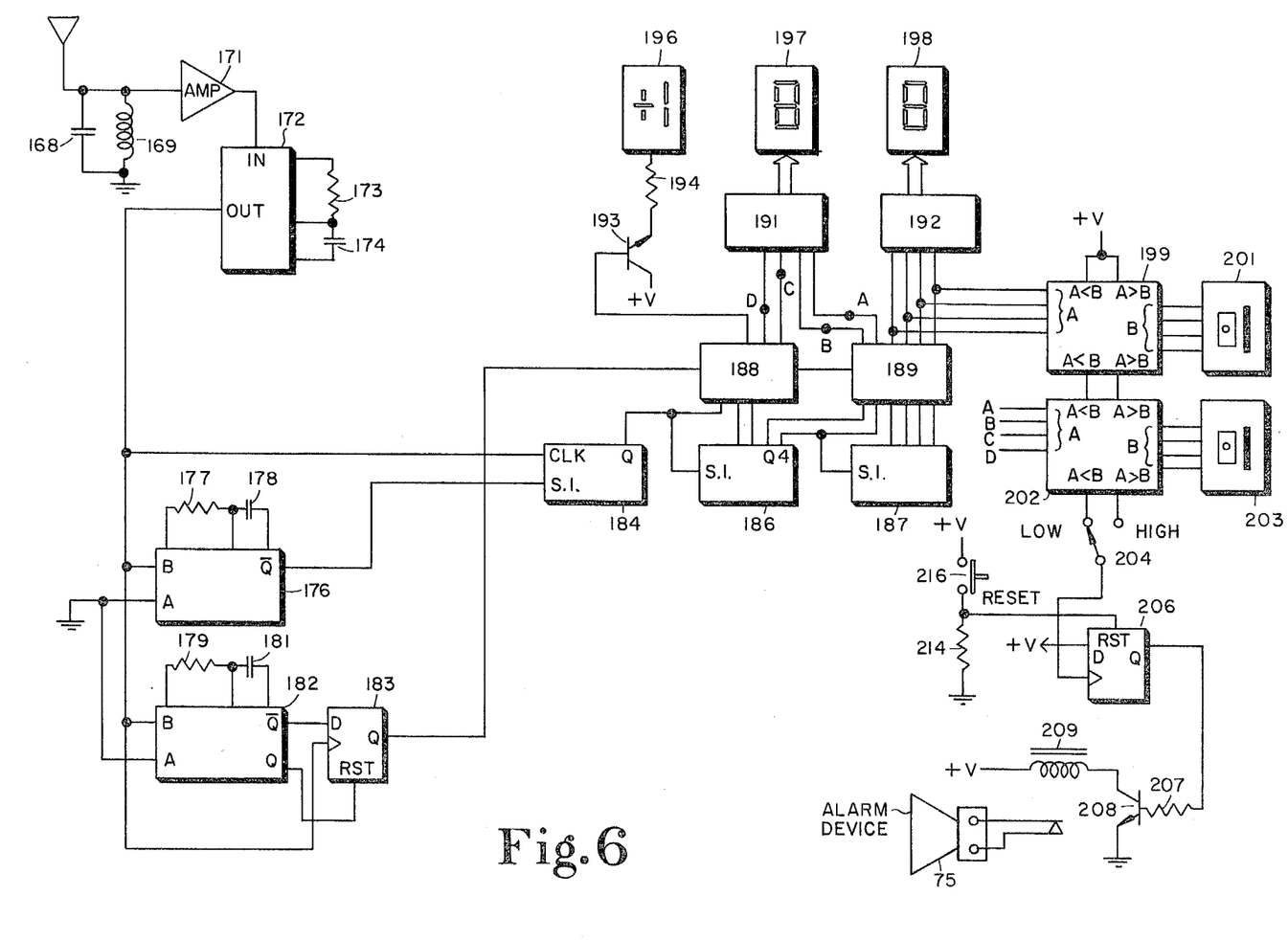
FIG. 6 is a schematic diagram of the receiver circuitry.

Referring now to the signal receiver in FIG. 6, the signal, as received, will now be a string of 200 kHz bursts which are amplified by RF amp 171. The amplifier output pulses are passed to a phase locked loop (PLL) 172, which will give a low output whenever the burst is present. When the output of the PLL initially goes low, one-shots 176 and 182 are triggered. If the PLL output returns high before the zero/one detector one-shot 176 times out, the pulse is considered to be a zero; if the pulse is longer than the one-shot time, it is considered to be a one. The appropriate bit is shifted into a nine bit shift register consisting of 184, 186, and 187.

When the sync pulse signaling the start of a new data frame is detected by the sync detector including the one-shot, 182 and flip-flop 183, data is loaded from the shift registers into latches 188 and 189 from which it is outputted through transistor 193 and decoder/drivers 191 and 192 to LED displays 196, 197, and 198. The data is also compared in magnitude comparators 199 and 202, to the setting of thumbwheel switches 201 and 203. If the temperature indication is above or below this setting, the indication depending on the user's setting of the HIGH-LOW choice switch 204, an alarm device, for example, such as a horn 75 (FIGS. 6 and 1) will be activated by transistor 208 and relay 209 and will remain active until reset by the reset button 216.

Figure 5:
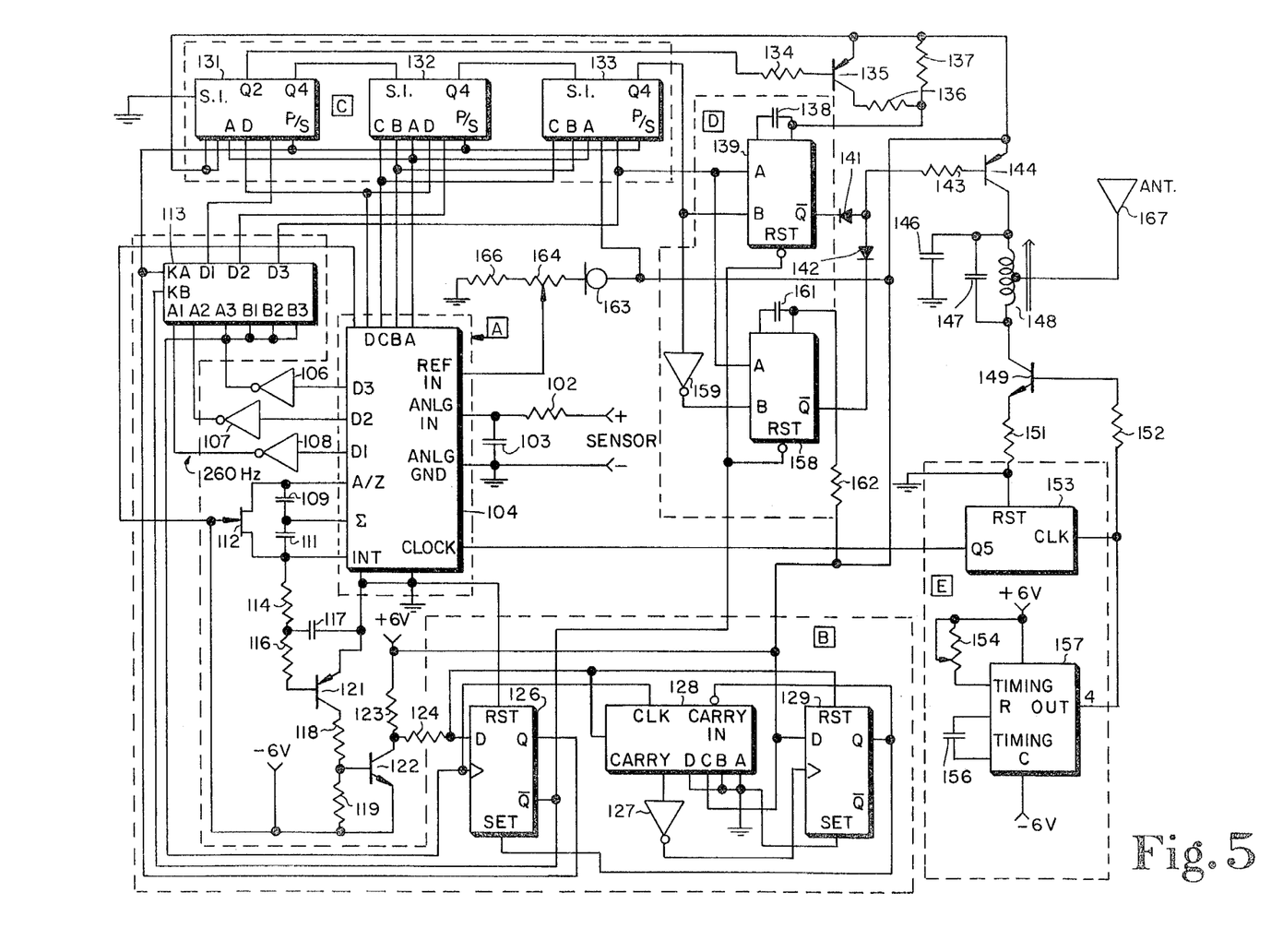
FIG. 5 is a schematic diagram of the transmitter circuitry.

In the event that a manufacturer or user would want to avoid the transmitter and receiver circuitry of FIGS. 5 and 6, it could be done using a slip ring or rings. Referring to FIG. 7, the signal from sensor 101 of FIG. 4 could be passed over slip rings 302 and 303 mounted between Tee bar 24 and bridge frame 28 of FIG. 1. Stirring machines such as shown in the aforementioned Murphy patents use such slip ring contactors (28 in FIG. 1 of Murphy U.S. Pat. No. 3,251,582, for example) for electric power supply to the stirrer motor, and a similar arrangement can be provided to implement the present invention for signal transfer from the sensor to the analog-to-digital (A/D) convertor 304 which may be mounted in the readout box 72 (FIG. 1) if desired. The output of the converter is coupled to an LED or LCD display device 305 to show temperature. The alarm set could be the same as in FIG. 6.

Referring to FIG. 8, the signal from sensor 101 could, be either above means or by being added to the common electrical voltage (many farms are on the same transformer) be conveyed to a microprocessor containing a device programmed for the A/D function. This device 311 would drive the display readout 312 and alarm 75 as seen above. The user can select the temperatures or range of temperatures to be monitored with the input switches device 314. Both the input 314 and a readout with alarm capability could be remote, i.e. located in the user's office or home.

In developing the particular application of storage monitoring, we became aware of the need and possibility of monitoring, and even controlling, the processing for safe storage.

Referring again to FIG. 1, the storage vessel 11 has the sensor 54 mounted on the arm on the stirring device. For controlled processing (drying of grain in this case) many conditions should be co-monitored. The weather conditions, particularly outdoor temperature ($T_1$) and humidity ($H_2O$-1), but also pressure, wind speed, and dew point play significant roles in grain drying. To do optimum drying, an extension of the bin monitoring could be developed. Temperature or temperature and humidity data could be sensed after the air has passed the fan 21 and is between floors 18 and 17 and referred to hereafter as $T_2$ and $H_2O$-2 for temperature and humidity, respectively, at that location. It could be also be sampled at door 22 ($T_4$ and $H_2O$-4) and at the top of the bin opening 16 ($T_5$ and $H_2O$-5). By combining these readings with sampled or inputted weather data, plus inputs from energy usage, i.e. liquefied petroleum (L.P.) gas and electricity, sufficient data could be accumulated to enable optimization research and processing.

Referring to FIG. 9, sensor 101 plus any needed sensor 401 would pass signals to an analog switch 321 which, under the control of sensor selector control 322, which is controlled ultimately by user or control program, sends the signals to the A/D convertor 323 which can be an RCA No. CD 4066, and into a computer 324 which can be an Apple II, for example.

First, by comparing the temperature at $T_1$ and $T_2$ and the ambient humidity, either sensed or inputted from current weather information, the need for, and efficiency of applied heat could be ascertained. Likewise, comparing $T_2$ with $T_3$ (temperature at sensor 101) would help determine the effect of heating or drying the grain. $T_3$ might, in effect, act as a "wet bulb" measurement for determining the humidity of equilibrium of the grain with the air. Comparisons also between $T_2$, $T_3$, and $T_4$ and $T_5$ could aid in determining the grain and air humidity conditions.

As an example, if, in conjunction with knowing the air flow from fan rpm, air velocity, or static air pressure or just calculated values, the volume and humidity content of the moving drying air could be compared to the exit humidities, then the amount of water removed from the grain might be calculated. This, when compared with the quantity of material in the vessel and the original moisture, would provide a means to compute the grain moisture. For that matter, several such substances could also be monitored. Several drying processes and even distilling, and mixing processes could benefit from multiple sensing and condition monitoring.

Another control possibility exists in the monitoring of the exit relative humidity. By knowing the conditions of ambient temperature and humidity, $T_1$ and $H_2O$-1, through $T_5$ and $H_2O$-5 or portions thereof as are needed, the exit humidity can be determined and compared to the overall process goals. It might be that maintaining a humidity of 99% or a little less, would offer the best efficiencies.

Another use of humidity moisture monitoring of grain is that, with the multiple monitoring of conditions, an optimization of natural air usage could be effected. By knowing the temperature and thus, relative risk of the stored grain, with sensor $T_3$ or $T_4$, the drying could be stretched out over a period of 10 days vs. 4 days for a savings of 4¢ a bu. or $400 for a 10,000 bu. bin. The multiple sensing system allows for maximization of drying during the most favorable times, while at the same time, watching that the grain is not heating up.

The use of multiple sensing with a computer allows for heat and humidity profiling. In bins without content stirrers, spoilage risk might be determined by making heat profile checks as well as humidities profiles. In essence, it is a matter of plotting several responses over time, and comparing them to an ideal computed curve for those conditions.

To develop such a profile, the air about the fan is sampled; then the fan is turned on. The temperatures at $T_2$, $T_4$ and $T_5$ are then recorded over time, and the rate and characteristics displayed.

The presence of the computer also allows cost accounting of the process as well as monitoring and control. The control could be effected by relays to the fan current and gas flow or burner timers. Having such control and monitoring could better allow independent grain dealers to provide better and more competitive services.

An additional means for securing a temperature profile of a bin would be to form a meshwork of sensors above the grain. This could be a net stretched across the bin above the stirring apparatus, with a sensor at each intersection of strands of of the net. As the fan was turned on, individual sections of the surface area of the grains surface could be sampled. This would allow better location of potential hot spots.

Benefits from multiple monitoring and computer use are:

1. Allow use of currently available optimization programs for grain drying.
2. Determine efficiency of air and heated air $T_1-T_2$.
3. Determine humidity equilibrium and thus moisture content of grain $T_2-T_3$, $T_2-T_4$.
4. Calculate weight of water removed—grain moisture air flow and drying capacity $T_1-T_2$, $T_5$.
5. Monitor drying effectiveness—exit $H_2O\%$ $T_4-T_5$, $H_2O\%-H_2O\%5$.
6. Maximization of natural air; monitor electricity use as savings of non intensive drying.
7. Spoilage control in non stirred bin. Bins measure heat and humidity profile from time fan is started. Examples of Components Useful in Illustrated Circuitry are: In the transmitter (FIGS. 4 & 5)

| | |
|---|---|
| LD130CJ A/D CONV. | 104 |
| CD4019 AND/OR Select Gate | 113 |
| CD4013 D Flip-Flop | 126, 129 |
| CD4035 Shift Register | 131, 132, 133 |
| CD4528 Monostable Multivibrator | 139, 158 |
| 565 Phase Locked Loop | 157 |
| CD4516 Binary Counter | 128 |
| CD4024 Binary Counter | 153 |
| CD4009 Hex Inverter | 127 |
| Trimmer Pots. | |
| CR039 Constant Current Diode | 211 |
| 1N4148 Diodes | 141, 142 |
| PNP Transistors | 121, 135, 144 |
| NPN Transistors | 122, 149 |
| MYLAR Capacitors | |
| SPF792 JFET | 112 |
| ¼W Carbon Film Resistors | |
| Adjustable Inductor | 148 |

In the Receiver (FIG. 6)

| | |
|---|---|
| CD4528 Monostable Multivibrator | 176, 182 |
| NE567 Phase Locked Loop | 172 |
| CD4013 D Flip Flop | 183, 206 |
| CD4035 Shift Register | 184, 186, 187 |
| Common Cathode LED Displays | 196, 197, 198 |
| CD4511 BCD to 7 Segment Decoder/Driver | 191, 192 |
| CD4585 Magnitude Comparator | 199, 202 |
| BCD Thumbwheel Switches | 201, 203 |
| 6V Relay | 209 |
| SPDT Switch | 204 |
| NPN Transistors | 193, 208 |
| ¼ W Resistors | |
| Adjustable Inductor | |
| MYLAR Film Capacitors | |

The invention claimed is:

1. A method of monitoring condition of stored contents of a storage vessel comprising the steps of:
    locating a contents condition sensor in said stored contents;
    power driving and thereby transferring said sensor primarily horizontally through said contents and at a substantially uniform depth below the surface of said contents;
    using the surface of the contents for at least partially supporting the sensor so that the sensor elevation is coordinated with the content surface elevation to follow surface contour and maintain said depth as said sensor is driven; and
    producing a signal in response to change of condition of said contents sensed by said sensor.

2. A method of monitoring condition of stored contents of a storage vessel comprising the steps of:
    locating contents condition sensor in said stored contents;
    power driving and thereby transferring said sensor through said contents;
    producing a signal in response to change of condition of said contents sensed by said sensor; and
    moving a transmitter simultaneously with said sensor, and transmitting from said transmitter by wireless transmission information from said sensor to a stationary receiver for production of said signal.

3. The method of claim 2 wherein the step of transmission is done at radio frequency.

4. In a storage vessel having stirring apparatus therein, and wherein the stirring apparatus includes hanger means above the material stored in the vessel, the improvement comprising:
    a probe mounted to said hanger means; and
    a sensor mounted to said probe for reception in the stored material.

5. The improvement of claim 4 wherein:
    said hanger means include a stationary portion and a movable portion;
    an information sending means is coupled to said sensor and mounted on said movable portion; and
    an information receiver means is mounted on said stationary portion and operable to wirelessly receive information from said sending means.

6. The improvement of claim 4 wherein:
    said hanger means include a stationary portion and a movable portion; and
    said movable portion includes an arm rotatable in said vessel generally about a vertical axis, and a carriage mounted on said arm and movable radially on said arm, in and out with respect to said axis.

7. The improvement of claim 6 wherein:
    said probe is mounted to said carriage.

8. The improvement of claim 7 wherein:
    said carriage has at least one auger extending vertically downward from it and powered to auger stored material upwardly in the vessel;
    said sensor being adjacent said auger to sense the temperature of said material moved upwardly by said auger.

9. The improvement of claim 8 wherein:
    said one auger is one of a pair of augers mounted on said carriage, and said sensor is located in a plane tangent a circle about said axis and between the two augers of the pair.

10. The improvement of claim 4 wherein said probe includes:
- a first arm having a proximal end portion pivotally mounted to said hanger means to pivot in a substantially vertical plane; and
- a second arm having a proximal end portion pivotally mounted to a distal end portion of said first arm to pivot in a substantially vertical plane;
- and a tube secured to a distal end portion of said second arm, said sensor being located in a distal end of said tube.

11. The improvement of claim 10 wherein said probe includes:
- a sled between the distal end of said second arm and the distal end of said tube for supporting said second arm on the surface of material stored in the vessel.

12. The improvement of claim 11 wherein:
said probe further includes a control arm pivotally mounted to said hanger means and to said second arm, with the pivot axis of said control arm establishing a parallelogram, with a portion of said second arm being a substantially vertical link of said parallelogram, and a portion of said hanger means being a substantially vertical second link of said parallelogram, whereby said second arm and tube are maintained in a substantially vertical attitude while the distal end portion of said first arm is swingable vertically to accommodate resting of said sled on said surface at varying surface elevations of said material in said vessel.

13. The improvement of claim 12 wherein:
said hanger means includes means for driving said first arm horizontally in said vessel.

14. The improvement of claim 13 wherein:
said driving means include a stirrer mounting carriage having a stirrer extending downward into said material, said second arm extending substantially parallel and adjacent to said stirrer.

15. The improvement of claim 14 wherein:
said stirrer is a powered auger operable, when powered, to move material upward around said sensor and to the said material surface.

16. The improvement of claim 4 and further comprising slip ring means coupling information from said sensing means to a readout means on a stationary portion of said vessel.

17. The improvement of claim 16 and wherein:
said storage vessel is generally cylindrical;
said hanger means is located near the top of the storage vessel; and
said probe is driven in a generally curvilinear pattern.

* * * * *